April 7, 1936.  W. W. SLOANE  2,036,650
SHAKER CONVEYER
Filed June 4, 1934    2 Sheets-Sheet 2

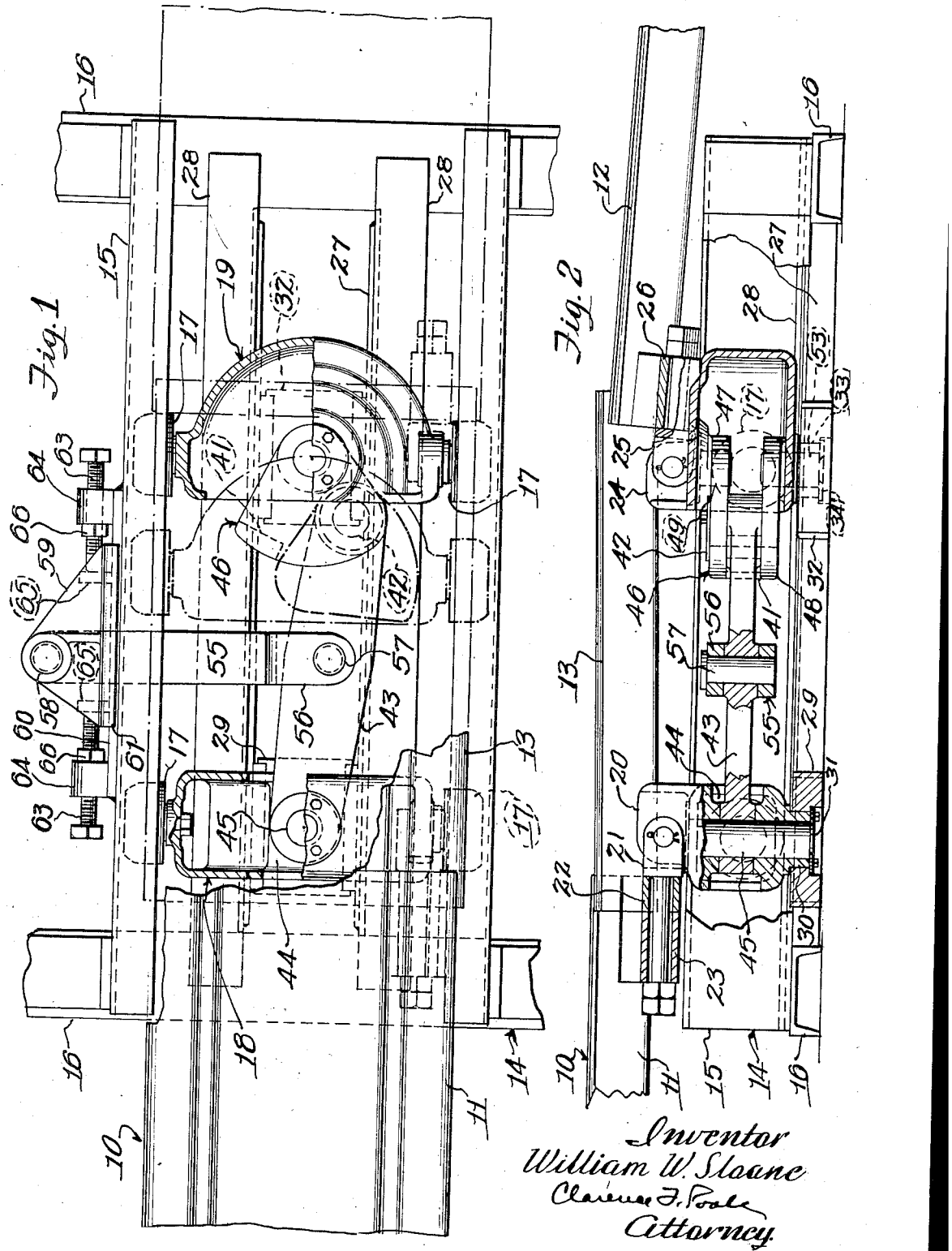

Inventor
William W. Sloane
Clarence F. Poole
Attorney

Patented Apr. 7, 1936

2,036,650

UNITED STATES PATENT OFFICE 2,036,650

SHAKER CONVEYER

William W. Sloane, Chicago, Ill., assignor to Goodman Manufacturing Company, Chicago, Ill., a corporation of Illinois Application June 4, 1934, Serial No. 728,860

21 Claims. (Cl. 198—220)

This invention relates to improvements in shaker conveyers and has as its principal object to provide a power transmitting device for interchangeably connecting adjacent portions of a trough or pan line in such a manner that the conveying effect of the driven trough will be different than that of the driving trough.

Other objects of my invention will appear from time to time as the following specification proceeds.

My invention may be more clearly understood by reference to the accompanying drawings, wherein:

Figure 1 is a top plan view of one embodiment of my invention with certain parts broken away and in section to show certain details thereof;

Figure 2 is a side elevation of the embodiment of my invention illustrated in Figure 1, showing certain parts in substantially longitudinal section, to more clearly illustrate certain details of my invention;

Figure 3:
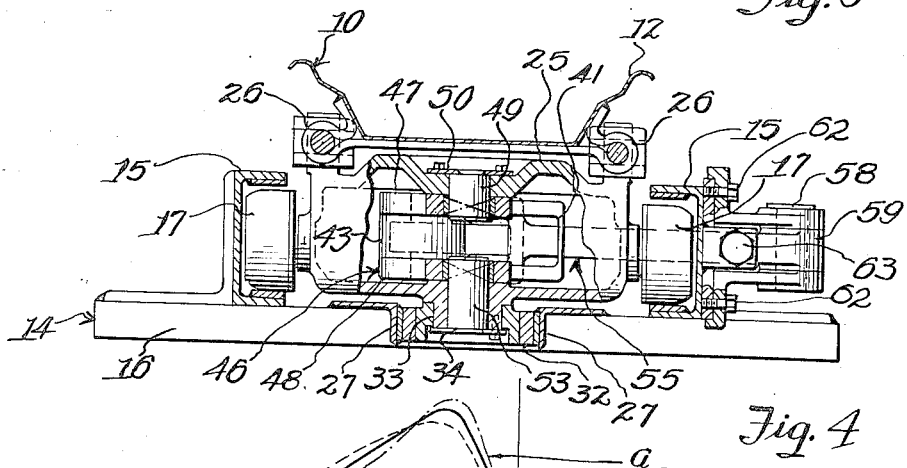
Figure 3 is a partial fragmentary transverse sectional view of the device shown in Figure 1 taken substantially along line 3—3 of Figure 1.
Figure 4:
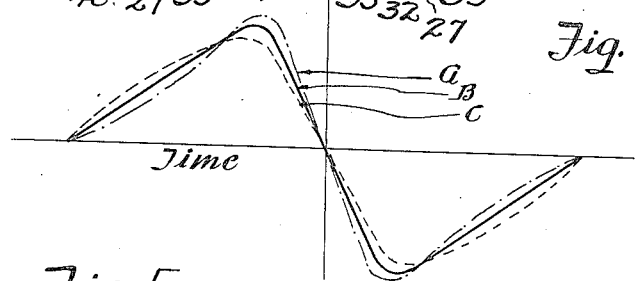

Figure 4 is a diagrammatic view showing several hypothetical velocity curves of a pan line when efficiently driven for conveying material along the level or up or down grades; and Figures 5, 6, 7, and 8 are diagrammatic views illustrating several arrangements of sections of the pan line with respect to each other and the connections and arrangement of the device of my invention for imparting the required conveying action to the driven section of the pan line.

In the drawings, the embodiment of my invention illustrated, shows the connecting device as being applied to a shaker conveyer trough or pan line 10 adapted to be driven by a suitable conveyer drive (not shown) in an ordinary manner. Said pan line, as herein shown, includes a trough section 11 adapted to be arranged at varying angular inclinations with respect to the ground, a trough section 12 which is also adapted to be arranged at varying angular inclinations with respect to the ground and a trough section 13 bridging the gap between these trough sections. Said trough sections may be any adjacent sections of a pan line which are to be driven with different relative violences with respect to each other.

The connecting device is mounted on a suitable base 14 adapted to be held in fixed relation with respect to the ground by suitable jacks, or the like (not shown). Said base includes a pair of inwardly facing channel members 15, 15 arranged in parallel relationship with respect to each other and supported adjacent their ends on suitable cross-members 16, 16 adapted to engage the ground and be held from movement with respect thereto.

The insides of the channel members form a track for suitable anti-friction roller devices 17, 17 supported adjacent opposite ends of suitable transverse supporting members 18 and 19. Each of these members together with their associated rollers forms a carrier device for supporting an end of each of the troughs 11 and 12, respectively, for reciprocable movement along the base 14, as will now be described.

The transverse member 18 is provided with parallel-spaced longitudinally extending upright flanges 20, 20 disposed adjacent opposite ends thereof which form transverse pivotal supports for forked connecting bolts 21, 21. Said forked connecting bolts are adapted to register for engagement with suitable eye-pieces 22, 22 extending laterally from the trough 13 and abutting eye-pieces 23, 23 extending laterally from the trough 11 for securing said troughs to said transverse member and permitting pivotal movement of said troughs with respect to said transverse member in a vertical plane.

In a like manner, the transverse member 19 is provided with a pair of parallel-spaced longitudinally extending upright flanges 24, 24 which form a transverse pivotal support for forked connecting bolts 25, 25. Said forked connecting bolts are adapted to engage suitable eye-pieces 26, 26 extending laterally from the trough 12 for pivotally securing said trough to said transverse member. It should be understood that, if desired, the connecting trough 13 may be connected adjacent the trough 12, instead of adjacent the trough 11 where the flow of material along the pan line is reversed and discharged from the trough 12 to the trough 11.

The transverse members 18 and 19 are held from lateral displacement with respect to each other by means of a guide 27 extending longitudinally along the central portion of the base 14. Said guide is formed by the vertical legs of inwardly facing parallel-spaced angles 28, 28 secured adjacent their ends to the cross-members 16, 16. Said guide is adapted to be engaged by a guide shoe 29 journaled on a depending projection 30 of the transverse member 18. Said guide shoe is held on said projection by means of a plate 31 secured to the under portion thereof and abutting a bored shoulder formed in said shoe. In a like manner, a guide shoe 32 depending from the transverse member 19 is adapted to engage said guide. Said shoe is journaled on a projection 33 depending from the transverse member 19 and held from vertical movement with respect thereto by means of a plate 34 secured to said projection and abutting a bored shoulder formed in said shoe.

Referring now to the details of the connecting device forming my invention, a rocking arm 43 is pivotally mounted in a slot 44 on a vertical shaft 45 carried in the transverse member 18 and held from downward movement with respect thereto by means of the plate 31. Said rocking arm extends in a general direction towards the transverse member 19 and is pivotally connected to a rocking device 46 at its end adjacent said transverse member. Said rocking device, as herein shown, is formed from a section, shaped somewhat in the form of a U turned on its side, and includes an upper segment 47 and a lower segment 48 joined together by an integral connecting piece 41. Said segments are arranged to abut the upper and lower sides of the rocking arm 43 and are pivotally connected thereto adjacent one of their corners by a shaft 42. The segment 47 is journaled on the lower end of a shaft 49, which shaft is carried in the upper portion of the transverse member 25 and held from vertical movement with respect thereto by means of a suitable plate 50. Said plate is secured to the upper end of said shaft and said carrier member in a suitable manner. The segment 48 is journaled on the upper end of a shaft 53 coaxial with the shaft 49 and carried in the depending projection 33 of the transverse member 25 and held from downward movement with respect thereto by means of the plate 34. The arrangement is such that said rocking device may be rocked laterally with respect to said base by said rocking arm when disposed in a direction extending towards the transverse member 18 or in a direction extending away from said transverse member.

Means are provided for controlling rocking movement of the rocking arm 43 upon reciprocable movement of the transverse member 18 so that said rocking arm will rock at equal angles to a line intersecting the axes of pivotal movement of said rocking arm and the rocking device 46 during each stroke of the conveyer, in order that the length of the stroke of the driven carrier member may be the same as that of the driving carrier member. Said means includes a link or pendulum 55 which has a forked end 56 adapted to engage the upper and lower sides of said rocking arm and pivotally connected thereto intermediate the ends of the latter by means of a pivotal pin 57. The opposite end of said link is pivotally connected intermediate the ends of a pin 58 spaced laterally from one channel 15, which pin is mounted on its ends in a fixed fulcrum member 59 disposed at one side of the base 14. Said fulcrum member abuts and is adjustably mounted on a bearing plate 60 secured to the outer surface of one channel 15 in a suitable manner, and is provided with shoulders 61, 61 adjacent its upper and lower ends which engage the upper and lower sides of said bearing plate. Said fulcrum member, bearing plate and channel are slotted to permit pivotal movement of said link with respect thereto. Suitable cap screws 62, 62 extending through suitable longitudinally extending slots formed in said fulcrum member are threaded in the bearing plate 60 for securing said fulcrum member thereto and permitting adjustment of said fulcrum member with respect thereto.

It should be noted that at times the base 14 is not accurately set so the stroke of the pendulum or link 55 and rocking arm 43 are properly positioned to cause the stroke of the driven carrier member to be the same as that of the driving carrier member and to cause the kick or maximum conveying effect of the driven trough to occur in unison with that of the driving trough. For this reason, adjustment of the fulcrum member 59 is provided so said fulcrum member may be adjusted along the bearing plate 60 to position the pivotal axis of the pendulum or link 55 so that movement of the rocking arm 43 may be controlled to rock at equal angles to a line intersecting the axes of pivotal movement of said rocking arm and the rocking device 46 in the proper timed relationship with respect to the driving conveyer trough line. Said fulcrum member, as herein shown, is adjusted by means of a pair of adjusting screws 63, 63 threaded through lugs 64, 64 secured to and extending outwardly from the bearing plate 60 adjacent opposite ends thereof. Said adjusting screws are adapted to engage suitable flanges 65, 65 formed integral with and extending outwardly from opposite ends of said fulcrum member. Suitable lock nuts 66, 66 are provided on each screw to hold said screws in fixed relation with respect to each other. Thus, when the cap screws 62 are loosened from the fulcrum member 59, said fulcrum member may be moved along the plate 60 by the screws 63 while the conveyer is in operation, if desired, until the rocking arm 43 and rocking device 46 rock in the proper relationship with respect to each other.

It will be seen that when the rocking device 46 is positioned as is shown by solid lines in Figure 1, and when either of the transverse members 18 or 19 are driven in a reciprocable manner by means of suitable drive mechanism, that the link 55 will control rocking movement of the rocking arm 53 in such a manner that it will rock at equal angles to a longitudinal line intersecting the pivotal axes of said rocking arm and said rocking device 46. This, in turn, will rock said rocking device so that its axis of pivotal connection to said rocking arm will move to equal sides of said longitudinal line during each stroke of the conveyer. Such a motion will cause the displacement of the driven carrier member during various parts of the stroke to be different than that of the driving member, but the length of stroke of both carriers will be the same due to the arrangement and proportion of the links and levers with respect to each other. Thus, the difference in displacement of the carrier devices 18 and 19, with respect to each other, during various parts of the stroke caused by rocking movement of the arm 43 and rocking device 46 in the manner previously described, change the violence of the drive motion of the driven carrier. Said drive motion of the driven carrier will be less than that of the driving carrier when positioned as shown by solid lines in Figure 1, and the carrier 18 is the driving carrier.

When it is desired to increase the conveying effect of the trough 12, and the carrier member 18 is driven by the trough 11, it is only necessary to pivot the rocking device 46 two-hundred and seventy degrees in a clockwise direction from the position shown by solid lines in Figure 1, to the position shown by dotted lines in said figure. It is obvious that the same arrangement could be obtained by pivoting the rocking device 46 ninety degrees in a counter-clockwise direction if it were not for the connecting member 41. In order to increase the driving effect of the driven carrier 19, the link 55 is disconnected from the fulcrum member 59 by removing the pin 58 therefrom. This will permit said link to slide in the slot formed in said fulcrum member so the carrier member 19 may be moved towards the carrier member 18 and the rocking device 46 may be pivoted in a clockwise direction until said carrier members are positioned, as is shown by dotted lines in Figure 1. Said pin may then be replaced to form a pivot for said link to control rocking movement of the rocking arm 43 in such a manner that it will again rock at equal angles to a longitudinal line intersecting the pivotal axes of said rocking arm and rocking device during each stroke of the conveyer.

Referring now in particular to Figures 4 to 8, inclusive, the curve indicated by line B in Figure 4 is a velocity curve of a conveyer drive motion most suitable for conveying material along the level where the pan line is of a moderate length. Said curve will hereinafter indicate the motion imparted by the conveyer drive mechanism to the level portion of the pan line. In a like manner, curve A represents a most efficient motion for conveying material upgrade and curve C represents a most efficient motion for moving material down grade. The relationship of these curves with respect to each other is such that coal movement up a moderate grade, when moved by a motion whose velocity is that represented by curve A, will be substantially the same as coal movement along the level where the trough line is driven by a mechanism whose velocity is that represented by curve B. Similarly, coal movement down a moderate grade when driven by a mechanism whose velocity is that represented by curve C will be substantially the same as coal movement along the level when the trough line is driven by a mechanism whose velocity is such as is represented by curve B.

Figure 5:
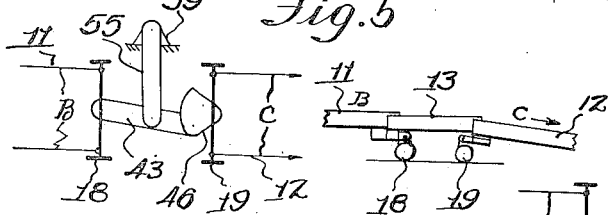

When the trough 11 is driven by a mechanism whose velocity is similar to that represented by curve B in Figure 4, and is arranged along the level, and the trough 12 is inclined downwardly with respect thereto, as shown in Figure 5, it is desirable that the conveying effect of the trough 12 be less than that of the trough 11 in order that the movement of coal along said inclined trough be not too fast. In order to impart such conveying effect to the trough 12, the rocking device 46 is arranged to extend from the carrier device 19 toward the carrier device 18, as is indicated in Figure 5. When the arrangement is such, the conveying effect of the trough 12 will be less than that of the trough 11 for the reasons hereinbefore set forth, and similar to that indicated by the velocity curve C in Figure 4. Thus, coal movement along the troughs 11 and 12 will be substantially constant.

Figure 6:
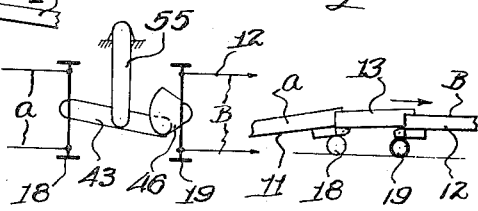

In Figure 6, the trough 11 is inclined upwardly with respect to the horizontal for conveying material upwardly therealong, and the trough 12 is arranged along the level. Thus, in order that the movement of coal along both of said troughs be substantially uniform, the conveying effect of the trough 11 must be greater than that of the trough 12. In order to impart such a conveying effect to the trough 11 and still drive the pan line by a mechanism whose velocity curve is indicated by line B in Figure 4, the drive mechanism may be connected to the trough 12 with the rocking arm 43 and rocking device 46, arranged in the same manner as in Figure 5. Thus, the carrier 18 is driven from the carrier 19 through said rocking arm and rocking device and the violence of the conveying effect imparted to the trough 11 is increased. It is, of course, obvious that the same effect may be provided by driving the trough 11 by a motion similar to that indicated by line A of Figure 4, but such a drive motion will unduly increase the stress on the drive mechanism, except in cases where the pan line is relatively short.

Figure 7:
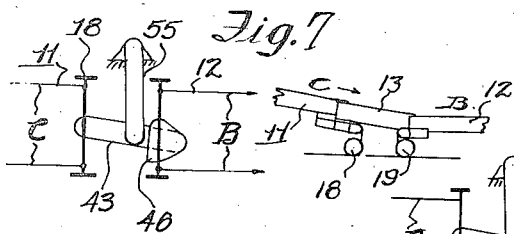

In Figure 7, the trough 12 is assumed to be substantially horizontal, while the trough 11 is inclined so that material will be discharged therefrom onto said horizontal trough. As herein shown, the trough 12 is driven at a velocity similar to that indicated by line B in Figure 4, and in order to decrease the conveying effect of the trough 11, the rocking devices 46 and 47 are pivoted two hundred and seventy degrees in a clockwise direction. With such an arrangement, the drive or the conveying effect of the driven trough and carrier is less than that of the driving trough and carrier, and coal movement along both of said troughs will be relatively constant.

Figure 8:
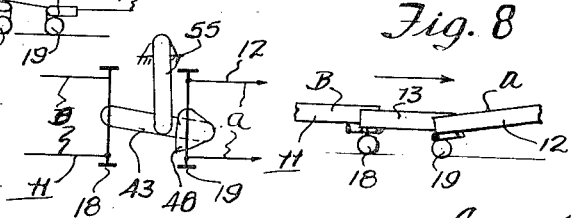

In Figure 8, the trough 11 is arranged in a substantially horizontal plane and the trough 12 is inclined upwardly with respect to the horizontal. The trough 11 is driven by a motion whose velocity is similar to that indicated by line B in Figure 4, and the rocking device 46 is arranged in the same manner as in Figure 7. Thus, a contrary conveying effect will be obtained than in Figure 7 and the conveying effect imparted to the driven carrier trough 12 will be increased so that the movement of material upwardly along said trough will be the same as along the trough 11.

It will be seen from the foregoing that a new and improved mechanism has been provided whereby a number of troughs or sections of a pan line may be arranged in several ways with respect to each other to conform to varying grades; that these troughs may be driven from a single drive mechanism; that the movement of material along said troughs is substantially uniform regardless of the fact that the troughs are inclined at various angles with respect to each other; that one or more of such power transmitting devices may readily be inserted in the pan line where a change in shaking effort is desired; and that the increased or decreased conveying action is obtained by means of a simplified and novel arrangement of rocking devices.

While I have herein shown and described one form of my invention, it will be understood that the construction and arrangement of the various parts may be altered without departing from the spirit and scope thereof. Furthermore, I do not wish to be construed as limiting myself to the specific form illustrated, excepting as it may be specifically limited in the appended claims.

I claim as my invention:

1. In a shaker conveyer, a conveyer pan line including two conveyer troughs adapted to be disposed at different inclinations with respect to each other, and means for operably connecting said first-named trough with said second-named trough arranged to change the conveying motion imparted to said second trough comprising a rocking arm connected to one of said troughs, a link pivotally connected to a fixed point at one of its ends and to said rocking arm at its opposite end and a rocking connection from said rocking arm to said other trough.

2. In a shaker conveyer, a conveyer pan line including two conveyer troughs adapted to be disposed at different inclinations with respect to each other, and means for operably connecting said first-named trough with said second-named trough arranged to change the conveying motion imparted to said second trough comprising a rocking arm connected to one of said troughs, a link pivotally connected to a fixed point at one of its ends and to said rocking arm at its opposite end and a pivotal connection from said rocking arm to said other trough comprising a rocking device pivotally connected to said other trough and a pivotal connection from said arm to said rocking device.

3. In combination with a shaker conveyer, a conveyer trough, a second conveyer trough, and a connection between said troughs whereby the second trough may be reciprocably driven by the first trough at a different conveying motion than the conveying motion of said first trough comprising a rocking arm having pivotal connection with one of said troughs at one of its ends, means pivotally connected to said rocking arm intermedaite the ends thereof for controlling rocking movement of said rocking arm and a rocking connection from the opposite end of said arm to said other conveyer trough.

4. In combination with a shaker conveyer, a conveyer trough, a second conveyer trough, and a connection between said troughs whereby the second trough may be reciprocably driven by the first trough at a different conveying motion than the conveying motion of said first trough comprising a rocking arm having connection with one of said conveyer troughs at one of its ends, means for controlling rocking movement of said rocking arm comprising a link pivotally connected to said rocking arm intermediate the ends thereof and having pivotal connection with a fixed point remote from said rocking arm, and a rocking connection from the opposite end of said rocking arm to said other conveyer trough.

5. In a shaker conveyer, a conveyer pan line including two conveyer troughs adapted to be disposed at different inclinations with respect to each other, and means for operably connecting said first-named trough with said second-named trough arranged to change the conveying motion imparted to said second trough comprising a rocking arm pivotally connected to one of said troughs, a rocking connection from said arm to said other trough and means for controlling rocking movement of said arm so that it may rock at equal angles to a line passing through its center and extending parallel to the longitudinal axis of said troughs.

6. In a shaker conveyer, a conveyer pan line including two conveyer troughs adapted to be disposed at different inclinations with respect to each other, and means for operably connecting said first-named trough with said second-named trough arranged to change the conveying motion imparted to said second trough comprising a rocking arm pivotally connected to one of said troughs, a rocking connection from said arm to said other trough and means for controlling rocking movement of said arm comprising a link having pivotal connection with said arm intermediate the ends thereof and extending laterally therefrom and mounted for pivotal movement about an axis remote from said rocking arm.

7. In a shaker conveyer, a conveyer pan line including two conveyer troughs adapted to be disposed at different inclinations with respect to each other, and means for operably connecting said first-named trough with said second-named trough arranged to change the conveying motion imparted to said second trough comprising a rocking arm pivotally connected to one of said troughs, a rocking connection from said arm to said other trough comprising a rocking device having pivotal connection with said arm and said other trough, and means for controlling rocking movement of said arm for rocking said rocking device at equal angles to a line extending longitudinally through its center during each stroke of said conveyer trough.

8. In a shaker conveyer, a conveyer pan line including two conveyer troughs adapted to be disposed at different inclinations with respect to each other, and means for operably connecting said first-named trough with said second-named trough arranged to change the conveying motion imparted to said second trough comprising a rocking arm pivotally connected to one of said troughs, a rocking connection from said arm to said other trough comprising a rocking device having pivotal connection with said arm and said other trough, and means for controlling rocking movement of said arm for rocking said rocking device at equal angles to a line extending longitudinally through its center during each stroke of said conveyer troughs comprising a link having pivotal connection with said rocking arm intermediate the ends thereof and having connection for pivotal movement about an axis remote from said rocking arm.

9. In a shaker conveyer, a conveyer pan line including two conveyer troughs adapted to be disposed at different inclinations with respect to each other, and means for operably connecting said first-named trough with said second-named trough arranged to change the conveying motion imparted to said second trough comprising a rocking arm pivotally connected to one of said troughs, a rocking connection from said arm to said other trough comprising a rocking device having pivotal connection with said arm and said other trough, and means for controlling rocking movement of said arm for rocking said rocking device at equal angles to a line extending longitudinally through its center during each stroke of said conveyer trough, comprising a link having pivotal connection with said rocking arm intermediate the ends thereof and extending laterally from said arm and having connection for pivotal movement about a fixed axis remote from said rocking arm.

10. In a shaker conveyer, two conveyer troughs adapted to be disposed at different inclinations with respect to each other, means for connecting said troughs together whereby one trough may drive the other and the motion of the driven trough will be less violent than that of the driving trough comprising a rocking arm connected to one of said troughs, a pivoted link movable about a fixed fulcrum having pivotal connection with said rocking arm intermediate the ends thereof, a rocking device pivotally connected to said other trough and extending from its pivotal axis towards said arm, and a pivotal connection between said arm and device for rocking said device at equal angles to a line extending longitudinally of said troughs and intersecting the pivotal axis of said rocking device.

11. In a shaker conveyer, two conveyer troughs adapted to be disposed at different inclinations with respect to each other, means for connecting said troughs together whereby one trough may drive the other and the motion of the driven trough will be less violent than that of the driving trough comprising a rocking arm connected to one of said troughs, a pivoted link having pivotal connection with said rocking arm intermediate the ends thereof, a rocking device pivotally connected to said other trough and extending from its pivotal axis towards said arm, and a pivotal connection between said arm and device for rocking said device at equal angles to a line extending longitudinally of said troughs and intersecting the pivotal axis of said rocking device and means for changing the motion of the driven trough in such a manner that its drive motion will be more violent than that of the driving trough comprising means for positioning said rocking device so that its point of connection to said arm with respect to its axis of pivotal movement is spaced rearwardly therefrom in a direction away from said first-named trough.

12. In a shaker conveyer, a conveyer pan line including two conveyer troughs adapted to be disposed at different inclinations with respect to each other, a carrier associated with each of said troughs and one of said carriers being reciprocated by its associated trough, and an operative connection between said carriers whereby one carrier may reciprocably move the other carrier and the conveying motion of the driven carrier may be of a different violence than that of the driving carrier comprising a rocking arm extending in a general longitudinal direction from one carrier and connected thereto for pivotal movement in a controlled path to opposite sides of a longitudinally extending line intersecting its pivotal axis, and a rocking device pivotally connected to said rocking arm and said other carrier.

13. In a shaker conveyer, a conveyer pan line including a pair of conveyer troughs adapted to be disposed at different inclinations with respect to each other, a carrier supporting an end of each of said troughs, and one of said carriers being reciprocated by its associated trough, and an operative connection between said carriers whereby one carrier may reciprocably move the other carrier and the conveying motion of the driven carrier may be of a different violence than that of the driving carrier comprising a rocking arm extending in a general longitudinal direction from one carrier and connected thereto for pivotal movement in a controlled path to opposite sides of a longitudinally extending line intersecting its pivotal axis, a rocking device pivotally connected to said other carrier for pivotal movement about a vertical axis intersected by a longitudinal line intersecting the axis of pivotal movement of said rocking arm, and a pivotal connection between said rocking arm and rocking device for effecting rocking movement of said rocking device to equal sides of said longitudinal line during each stroke of said shaker conveyer.

14. In a shaker conveyer, a conveyer pan line including a pair of conveyer troughs adapted to be disposed at different inclinations with respect to each other, a carrier associated with each of said troughs and one of said carriers being reciprocated by its associated trough, and an operative connection between said carriers whereby one carrier may reciprocably move the other carrier and the conveying motion of the driven carrier may be of a greater violence than that of the driving carrier comprising a rocking arm extending in a general longitudinal direction from one carrier and connected thereto for pivotal movement in a controlled path, a rocking device pivotally connected to said other carrier and extending therefrom in a general direction away from said other carrier, and a pivotal connection between said rocking arm and rocking device for rocking said rocking device to equal angles of a line extending through the center lines of said rocking arm and rocking device, and means for changing the conveying effect of said driven trough so that it will be of a less violence than that of the driving trough comprising means for adjusting said rocking device so that it will extend in a general direction towards said other carrier and rock at equal angles to said longitudinal line.

15. In a shaker conveyer, a conveyer pan line including a pair of conveyer troughs adapted to be disposed at different inclinations with respect to each other, a carrier for supporting each of said troughs and one of said carriers being reciprocated by its associated trough, and an operative connection between said carriers whereby one carrier may reciprocably move the other carrier and the conveying motion of the driven carrier may be of a different violence than that of the driving carrier comprising a rocking arm extending in a general longitudinal direction from one carrier and connected thereto for pivotal movement about a vertical axis, a rocking device pivotally connected to said other carrier and a pivotal connection between said rocking device and rocking arm, and means for controlling pivotal movement of said rocking device whereby it may rock at equal angles to a line intersecting the axes of pivotal movement of said rocking arm and rocking device comprising a link mounted for pivotal movement about a fixed axis offset from said arm and a pivotal connection from said link to said arm.

16. In a shaker conveyer, a conveyer pan line including a pair of conveyer troughs adapted to be disposed at different inclinations with respect to each other a carrier supporting an end of each of said troughs, and one of said carriers being reciprocated by its associated trough, and an operative connection between said carriers whereby one carrier may reciprocably move the other carrier and the conveying motion of the driven carrier may be of a different violence than that of the driving carrier comprising a rocking arm extending in a general longitudinal direction from one carrier and connected thereto for pivotal movement about a vertical axis, a rocking device pivotally connected to said other carrier and a pivotal connection between said rocking device and rocking arm, and means for controlling pivotal movement of said rocking device whereby it may rock at equal angles to a line intersecting the axes of pivotal movement of said rocking arm and rocking device comprising a link mounted for pivotal movement about a fixed axis spaced laterally from said arm, and a pivotal connection from said link to said arm intermediate the ends of the latter.

17. In a shaker conveyer, a conveyer pan line including a pair of conveyer troughs adapted to be disposed at different inclinations with respect to each other, a carrier associated with each of said troughs, and one of said carriers being reciprocated by its associated trough, and an operative connection between said carriers whereby one carrier may reciprocably move the other carrier and the conveying motion of the driven carrier may be of a different violence than that of the driving carrier comprising a rocking arm extending in a general longitudinal direction from one carrier and connected thereto for pivotal movement about a vertical axis, means for controlling rocking movement of said rocking arm comprising a link pivotally connected to said arm and mounted for pivotal movement about a fixed axis offset from said arm and a rocking device pivotally connected to said other carrier for pivotal movement about a vertical axis, and an operative connection between said rocking device and rocking arm.

18. In a shaker conveyer, a conveyer pan line including a pair of conveyer troughs adapted to be disposed at different inclinations with respect to each other, a carrier associated with each of said troughs, and one of said carriers being reciprocated by its associated trough, and an operative connection between said carriers whereby one carrier may reciprocably move the other carrier and the conveying motion of the driven carrier may be of a different violence than that of the driving carrier comprising a rocking arm extending in a general longitudinal direction from one carrier and connected thereto for pivotal movement about a vertical axis, means for controlling rocking movement of said rocking arm comprising a link pivotally connected to said arm intermediate the ends of the latter and mounted for pivotal movement about a vertical axis stationary during movement of said carriers and spaced laterally from said rocking arm, and a rocking device pivotally connected to said other carrier for rocking movement about a vertical axis and operatively connected with said rocking arm whereby said rocking device will rock to equal sides of a line intersecting the axes of pivotal movement of said rocking arm and rocking device during each stroke of reciprocable movement of said carriers.

19. In a shaker conveyer, a conveyer pan line including a pair of conveyer troughs adapted to be disposed at different inclinations with respect to each other, a carrier supporting an end of each of said troughs and one of said carriers being reciprocated by its associated trough, and an operative connection between said carriers whereby one carrier may reciprocably move the other carrier and the conveying motion of the driven carrier may be of a different violence than that of the driving carrier comprising a rocking arm extending in a general longitudinal direction from one carrier and connected thereto for pivotal movement about a vertical axis, a rocking device pivotally connected to said other carrier and a pivotal connection between said rocking device and rocking arm, and means for controlling pivotal movement of said rocking device whereby it may rock at equal angles to a line intersecting the axes of pivotal movement of said rocking arm and rocking device comprising a link mounted for pivotal movement about an axis stationary during reciprocable movement of said shaker conveyer and spaced laterally from said arm beyond the boundaries of said troughs intermediate said carriers, and a pivotal connection between said link and arm intermediate the ends of the latter.

20. In a shaker conveyer, a conveyer pan line including a pair of conveyer troughs adapted to be disposed at different inclinations with respect to each other, a carrier associated with each of said troughs, and one of said carriers being reciprocated by its associated trough, and an operative connection between said carriers whereby one carrier may reciprocably move the other carrier and the conveying motion of the driven carrier may be of a different violence than that of the driving carrier comprising a rocking arm extending in a general longitudinal direction from one carrier and connected thereto for pivotal movement about a vertical axis, a rocking device pivotally connected to said other carrier and a pivotal connection between said rocking device and rocking arm, and means for controlling pivotal movement of said rocking device whereby it may rock at equal angles to a line intersecting the axes of pivotal movement of said rocking arm and rocking device comprising a link mounted for pivotal movement about an axis adjustable longitudinally of said troughs which is adapted to remain stationary during reciprocable movement of said shaker conveyer and spaced laterally from said arm beyond the boundaries of said troughs intermediate said carriers, and a pivotal connection between said link and arm, intermediate the ends of the latter.

21. In combination with a shaker conveyer, a conveyer trough, a second conveyer trough, a guide frame, a wheeled support member movable along said guide frame and forming a support for one of said conveyer troughs, another wheeled support member movable along said guide frame and forming a support for said other trough and a connection between said troughs whereby one trough may be reciprocably driven by the other trough at a different conveying motion than the conveying motion of the driving trough comprising a rocking arm pivotally connected to one of said wheeled support members, means pivotally connected to said rocking arm intermediate the ends thereof for controlling rocking movement of said rocking arm, and a rocking connection from the opposite end of said arm to said other wheeled support member.

WILLIAM W. SLOANE.